(12) United States Patent
Zhang et al.

(10) Patent No.: US 10,564,716 B2
(45) Date of Patent: Feb. 18, 2020

(54) 3D GAZING POINT DETECTION BY BINOCULAR HOMOGRAPHY MAPPING

(71) Applicant: Hong Kong Applied Science and Technology Research Institute Company Limited, Hong Kong (HK)

(72) Inventors: Wei Zhang, Hong Kong (HK); Kin Lung Chan, Hong Kong (HK); Kam Ho Poon, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 27 days.

(21) Appl. No.: 15/894,124

(22) Filed: Feb. 12, 2018

(65) Prior Publication Data
US 2019/0250705 A1    Aug. 15, 2019

(51) Int. Cl.
| | | |
|---|---|---|
| *G06F 3/01* | (2006.01) | |
| *G02B 27/01* | (2006.01) | |
| *G06F 3/0481* | (2013.01) | |
| *G06T 7/70* | (2017.01) | |
| *G06T 7/80* | (2017.01) | |

(52) U.S. Cl.
CPC ........... *G06F 3/013* (2013.01); *G02B 27/017* (2013.01); *G06F 3/04815* (2013.01); *G06T 7/70* (2017.01); *G06T 7/80* (2017.01); *G02B 2027/0178* (2013.01)

(58) Field of Classification Search
CPC ................. G06F 3/013; G02B 27/017; G02B 2027/0178; G06T 7/80
See application file for complete search history.

(56) References Cited

U.S. PATENT DOCUMENTS 6,553,281 B1    4/2003  Liu
6,578,962 B1    6/2003  Amir et al.
(Continued)

FOREIGN PATENT DOCUMENTS

CN    102176755 A    9/2011

OTHER PUBLICATIONS

Mitsugami et al., "Estimation of 3D gazed position using view lines", Proceedings of 12th International Conference on Image Analysis and Processing, 2003, Mantova, Italy (Year: 2003).*
(Continued)

*Primary Examiner* — Xuemei Zheng
(74) *Attorney, Agent, or Firm* — Spruson & Ferguson (Hong Kong) Limited

(57) ABSTRACT

A system for detecting a gazing point of a user in a three-dimensional (3D) space based on a virtual screen is provided. The system includes at least a processor and a wearable device, the wearable device further comprising an external camera arranged for capturing images of the user's field of view, and two internal cameras arranged for capturing binocular images of the user's left and right eyes. The processor is designed to determine the gazing point of the user based on a virtual screen. The coordinates of the pupil center as determined according to the images from the internal cameras are mapped to the images from the external camera based on a left and a right mapping relationships, which further mapped to the virtual screen as an intermediate screen for calculating the 3D coordinates of the gazing point.

16 Claims, 11 Drawing Sheets

(56) References Cited

U.S. PATENT DOCUMENTS

| | | |
|---|---|---|
| 2005/0200806 A1 | 9/2005 | Knaan et al. |
| 2011/0182472 A1 | 7/2011 | Hansen |
| 2012/0294478 A1 | 11/2012 | Publicover et al. |
| 2013/0154913 A1* | 6/2013 | Genc .............. G06F 3/012 345/156 |
| 2013/0188834 A1 | 7/2013 | Ebisawa |
| 2013/0329957 A1 | 12/2013 | Ebisawa |
| 2016/0267708 A1 | 9/2016 | Nistico et al. |
| 2017/0102768 A1 | 4/2017 | Zhang et al. |
| 2018/0267604 A1* | 9/2018 | Bhattacharya ......... G06F 3/013 |

OTHER PUBLICATIONS

International Search Report and Written Opinion of PCT application No. PCT/CN2018/076814 issued from the International Search Authority dated Nov 13, 2018.

W. W. Abbott et.al., Ultra-low-cost 3D gaze estimation: an intuitive high information throughput compliment to direct brain-machine interfaces, J. Neural Eng. 9 (2012) 046016.

Moritz Kassner et.al., Pupil: An Open Source Platform for Pervasive Eye Tracking and Mobile Gaze-based Interaction, arXiv:1405.0006.

\* cited by examiner

FIG. 10

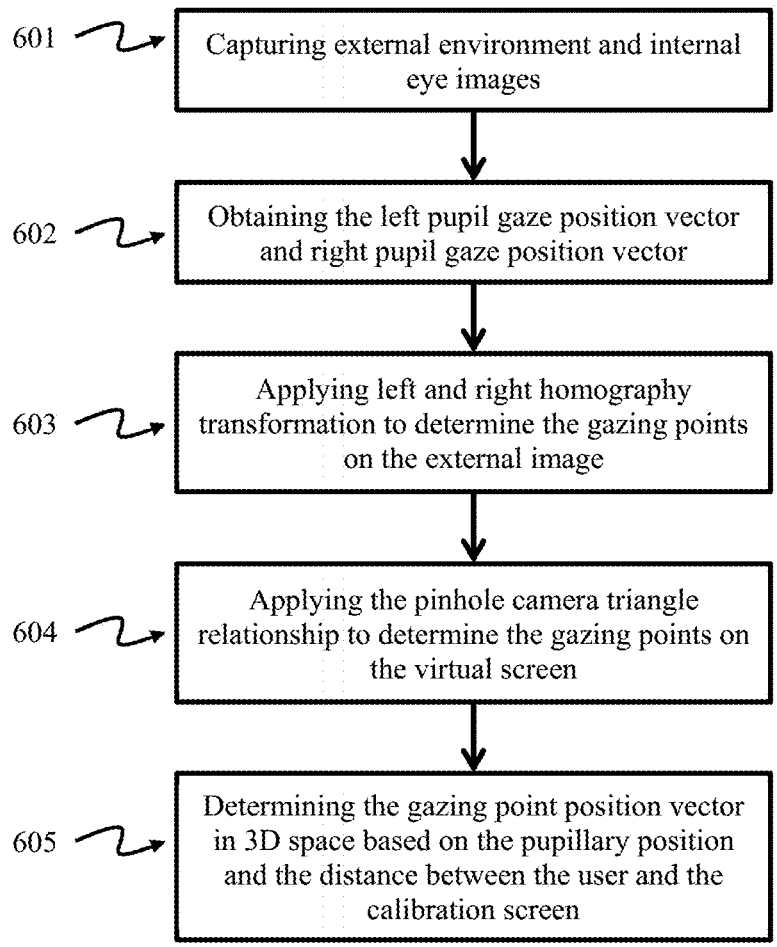

601 — Capturing external environment and internal eye images

602 — Obtaining the left pupil gaze position vector and right pupil gaze position vector 603 — Applying left and right homography transformation to determine the gazing points on the external image 604 — Applying the pinhole camera triangle relationship to determine the gazing points on the virtual screen 605 — Determining the gazing point position vector in 3D space based on the pupillary position and the distance between the user and the calibration screen

FIG. 11

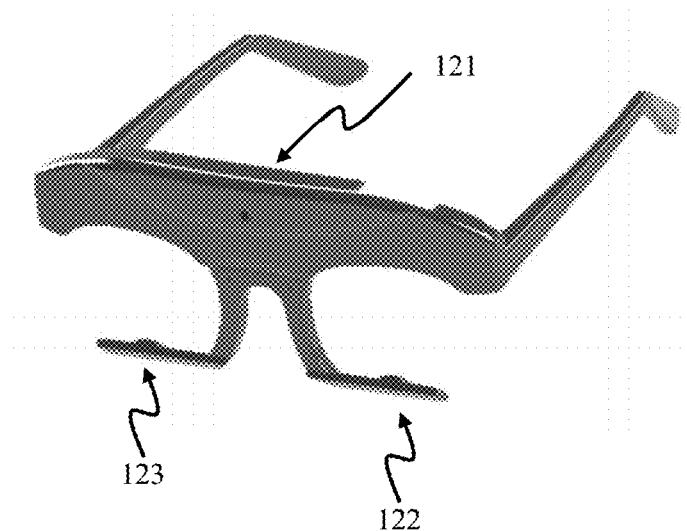

3D GAZING POINT DETECTION BY BINOCULAR HOMOGRAPHY MAPPING

FIELD OF THE INVENTION

The present disclosure generally relates to a method and a system for detecting a user's gazing point. In particular, the present disclosure relates to a method and a system for determining the gazing point coordinates in a three dimensional (3D) space using a virtual screen.

BACKGROUND OF THE INVENTION

With the advancement in computer technologies, particularly in the field of virtual reality and augmented reality, interest in the development of new user input mechanisms has increased. One area of research focuses on the use of the user's visual field for controlling a computer system. By knowing the position of the user's gazing point, human-computer interactions can be enhanced and provide a new control interface for applications ranging from virtual environments, gaming controls, augmented reality and neuro/psychological research. Using such a computer interface system, a user could control a computer or a portable device through the movement of their eyes without using any input equipment, such as a keyboard or a mouse. This control method could also effectively assist users with movement disabilities to control a computer or a portable device.

Gazing point detection and tracking technology has a long history of development with diverse methodologies proposed. For example, remote eye tracking is developed and used on smart televisions (TV) for selecting channels, and gazing point tracking is also developed for identifying a customer's preferences and interests for optimizing the customer experience in a shop. With the advancement in computational speed and a decrease in hardware dimensions, gazing point detection and tracking technology can now be employed in more sophisticated applications with higher detection accuracy and with less constraint on the technological use. Such human-computer interactions could enable new ways to control portable devices, such as smartphones and tablets, or home appliances including computers and TVs through the movement of a user's eyes.

Normally, gazing point trackers are portable platforms with at least one internal camera and one external camera, for monitoring the user's eye and the user's visual field respectively. The internal camera points towards the user's eyes for detecting the pupil, iris and/or eye glints (from corneal reflections), while the external camera is used to capture the user's visual field. In certain applications, the gazing point tracker can be integrated into a wearable device, such as head-mounted frame, eyewear article, or other headwear.

Conventional gazing point tracking method uses corneal reflections, as shown in FIG. 12, a camera directed towards the user captures images of the eye, wherein each image includes the corneal reflection of the light source (glint) and the position of the pupil center. The gazing point can be estimated according to the relative movement between the pupil center and glint positions. Such conventional methods require precise information on the location of the light source and camera. External ambient light from the environment may also affect the detection of the glint point. Furthermore, eye parameters, such as the pupil center, the center of curvature of cornea and the radius of corneal, are needed for gazing point detection. In view of the complexity of the calculations, there is a need for a method to simplify the calibration process and detection process without scarifying the precision and robustness of the system.

Although conventional methods are able to provide eye gaze detection and tracking, the consistency and precision of the detection methods are constantly challenged in view of the wide variations in eye parameters and other biological aspects of users, such as eye radius, pupillary distance and pupil size. Moreover, existing detection methods may require a controlled environment and/or detailed geometric measurements of parameters such as the user's head pose information, eye glints information, light sources and cameras locations, which increase complexity in the implementation and may create inconvenience to the user. The use of glints may also cause error to the measurement when there are other external light sources. Some other detection methods may highly rely on a display screen and the user may only fixate at any point limited by the dimension or relative position of the display screen. In addition, if the user's gazing point is outside the display screen, the accuracy of gaze detection may be sacrificed.

In light of the issues raised above, an improved device for gazing point detection in 3D space and method of use thereof that solves one or more of the problems raised above is needed.

SUMMARY OF THE INVENTION

An exemplary embodiment of the present disclosure provides a method and a system for detecting a gazing point of a user in a three-dimensional (3D) space based on a virtual screen. The system comprising one or more processors and a wearable device, the wearable device comprising one or more external cameras and two or more internal cameras, wherein the internal cameras are configured to capture the left and the right eyes of the user, the external cameras are configured to capture an external camera image. The one or more processors are configured to execute a method for detecting a gazing point of a user in a 3D space. The method includes a calibration process that can comprise generating a left and a right mapping relationships, and determining a pupillary distance ($D_{PP}$) of the user and a distance between the user and the calibration screen ($D_{ES}$); and a detection process for determining a gazing point position vector of the gazing point of the user with reference to the virtual screen, the virtual screen being used as an intermediate screen enabling a detection of the gazing point in the 3D space.

In accordance with a further aspect of the present disclosure, the generating of the left and the right mapping relationships can comprise calibrating one or more external cameras and two or more internal cameras using a plurality of calibration points on the calibration screen for obtaining the left and the right mapping relationships.

In accordance with a further aspect of the present disclosure, the determining of the gazing point position with reference to the virtual screen can comprise capturing, by the one or more external cameras, an external camera image; determining, according to one or more images captured by the two or more internal cameras, a left and a right pupil gaze position when the user fixates on the gazing point; and determining a left and a right gazing points on the virtual screen. The determining of the left and the right gazing points on the virtual screen can comprise applying the left and the right mapping relationships on the left and the right pupil gaze position and mapping the left and the right pupil gaze position to an image coordinates on the external camera image, whereby the gazing point position can be calculated based on the left and the right gazing points on the virtual screen, the pupillary distance ($D_{PP}$) of the user and a predetermined distance between the user and the calibration screen ($D_{ES}$).

In accordance with a further aspect of the present disclosure, the left and the right mapping relationships are determined in accordance with polynomial relationships, or a left and a right homography matrices.

In accordance with a further aspect of the present disclosure, the calibrating of the external cameras and the internal cameras for obtaining the left and the mapping relationships can comprise the steps of displaying the plurality of calibration points on the calibration screen sequentially, wherein each calibration point is positioned at one of corners of the calibration screen; determining, according to one or more images captured by the one or more external cameras, a plurality of calibration points coordinates for each of the plurality of calibration points; determining, according to one or more images captured by the two or more internal cameras, a plurality of pupil center calibration coordinates of the user's left and right eyes when the user fixates on each of the plurality of calibration points; and mapping the plurality of calibration points coordinates with the plurality of pupil center calibration coordinates of the user's left and right eyes for each of the plurality of calibration points.

In accordance with a further aspect of the present disclosure, the determining of the pupillary distance of the user can comprise the steps of determining, according to one or more images captured by the two or more internal cameras, a left and a right pupil relaxed coordinates of the user's left and right eyes when the user fixates on the calibration screen in a relaxed state; and applying the left and the right mapping relationships on the left and the right pupil relaxed coordinates to obtain the pupillary distance of the user.

In accordance with a further aspect of the present disclosure, the virtual screen can be an imaginary screen positioned at a distance equivalent to the predetermined distance between the user and the calibration screen. The determining of the left and the right gazing points on the virtual screen can further comprise applying the pinhole camera triangle relationship on the image coordinates on the external camera image to determine the left and the right gazing points on the virtual screen.

The details of one or more implementations of the present disclosure are set forth in the accompanying drawings and from the following detailed descriptions. Other features, structures, characteristics, and advantages of present disclosure will be apparent from the description and drawings, and from the claims.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

FIG. 10 is a flowchart illustrating the detection process for determining the position of the gazing point in accordance with certain embodiments of the present disclosure.

FIG. 11 is a wearable device in accordance with certain embodiments of the present disclosure.

Figure 1:
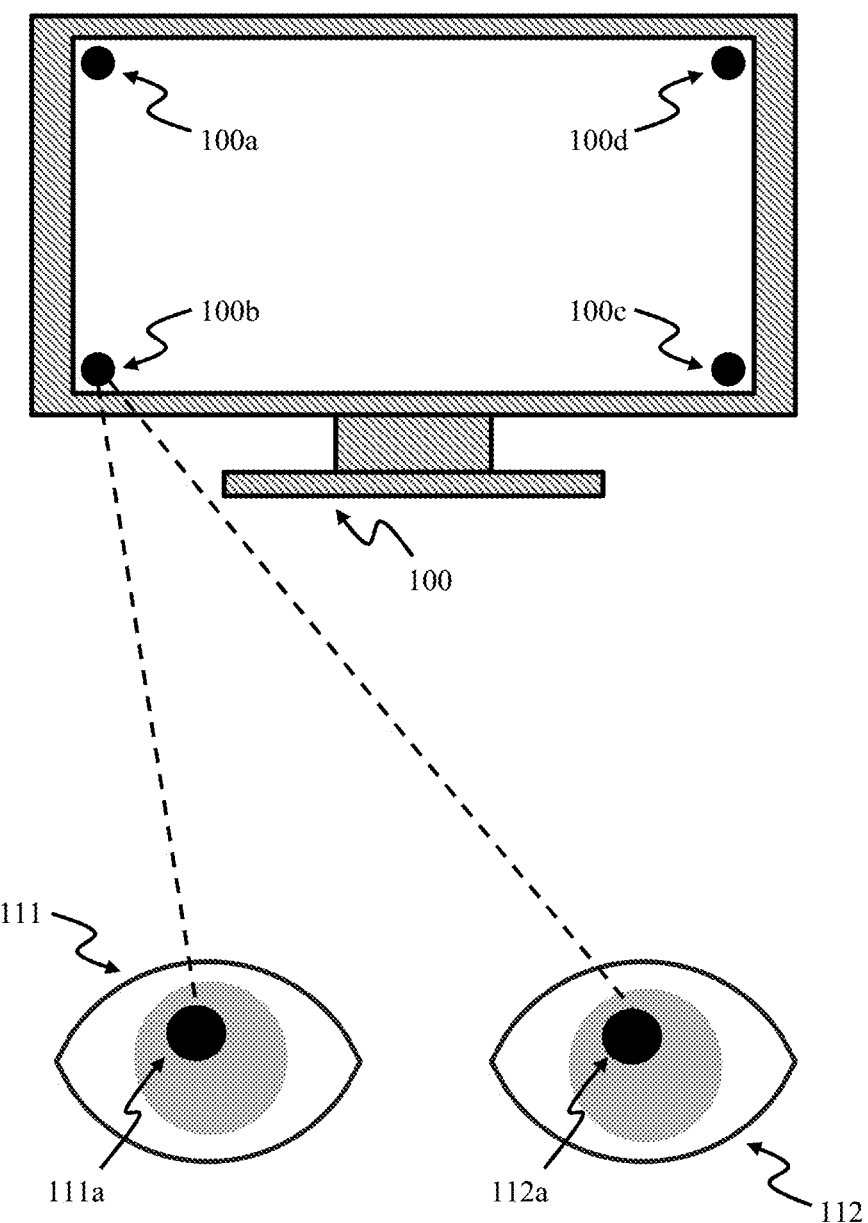
FIG. 1 is a diagram illustrating the method of displaying four calibration points on a screen for a user to gaze at during the calibration process in accordance with certain embodiments of the present disclosure.

Skilled artisans will appreciate that elements in the figures, particularly those conceptual diagrams, are illustrated for simplicity and clarity and have not necessarily been depicted to scale.

DETAILED DESCRIPTION

The following detailed description, the system and the corresponding detection methods are merely exemplary in nature and are not intended to limit the disclosure or its application and/or uses. It should be appreciated that a vast number of variations exist. The detailed description will enable those of ordinary skill in the art to implement an exemplary embodiment of the present disclosure without undue experimentation, and it is understood that various changes or modifications may be made in the function and arrangement of devices and methods of operation described in the exemplary embodiment without departing from the scope of the present disclosure as set forth in the appended claims.

For ease and clarity of discussion, the term "left" and "right" as used herein describe relative positions from the perspective of a user. However, as noted above such relative positions are for ease and clarity of discussion and do not limit any of these or other components disclosed herein from being on the left or on the right side.

The term "internal camera" as used herein refers to any kind of image sensors known in the art mounted on a wearable device facing at a user's eye for capturing images of the pupil. In certain embodiments, infrared (IR) camera or thermal imaging camera is used as the internal camera such that the pupil location can be obtained by IR illuminations from one or more IR light sources proximate to the user. The IR images obtained are not easily affected by the environmental conditions. Normally, there are at least two internal cameras, the "left internal camera" used to capture images of the user's left eye, and the "right internal camera" used to capture images of the user's right eye.

The term "external camera" as used herein refers to any kind of image sensors known in the art mounted on a wearable device facing away from the user for capturing visual images with a field of view close to or larger than the user's visual field. In certain embodiments, a visible light camera is used as the external camera such that the images obtained are more aligned with human visual system. During the calibration process in accordance to an aspect of the present disclosure, the external camera faces a calibration screen.

Furthermore, as used herein, the term "relaxed state" when used in connection with the user's gazing point refers to a state in which a user is looking at an object without a fixed point of focus. In the present disclosure, when the user looks in the direction of the calibration screen in a relaxed state, the user is not gazing at any specific point on the calibration screen. As a result, when the user looks towards the calibration screen in a relaxed state, the visual axis of the left eye and the visual axis of the right eye are approximately parallel to each other towards the calibration screen.

The term "position vector" as used herein refers to a geometric position in a three dimensional space that represents the position of the relating point in the form of (x,y,z).

Provided herein is a method for detecting a gazing point of a user in a three dimensional (3D) space based on a virtual screen. Also provided is a system, comprising a wearable device and one or more processors for detecting the gazing point of the user, wherein the wearable device further comprises one or more external cameras and two or more internal cameras. The two or more internal cameras are configured to capture binocular images of the left and the right eyes of the user and the one or more external cameras are configured to capture images of external environment that is close to or covers the visual field perceived by the user. The one or more processors are configured to execute a method according to the present disclosure for detecting the gazing point of the user in 3D space using a virtual screen. The wearable device may be realized in the form of, e.g., eye glasses or a head-mounted frame that can be mounted on a user's head.

Calibration Process

The calibration process of the present disclosure comprises generating a left and a right mapping relationships using a plurality of calibration points on a calibration screen 100, determining a pupillary distance ($D_{PP}$) 304 of the user based on images of the pupil in a relaxed state, and determining a distance between the user and the calibration screen ($D_{ES}$) 303. In certain embodiments, the left and the right mapping relationships are determined in accordance with polynomial relationships, or a left and a right homography matrices.

FIG. 1 illustrates certain embodiments in which four display calibration points 100a-100d are displayed on a calibration screen 100 for a user to gaze at during the calibration process. The calibration screen 100 may be a computer monitor, a liquid crystal display (LCD) on a tablet or mobile phone, a projected screen, or any flat surface or any other device that can show or present a plurality of calibration points oriented in a single plane. The calibration points used in connection with the calibration process are not limited by any shape, size, or color, but should be large enough and of a color or colors that are visually discernible by the user. The four display calibration points 100a-100d are predefined set of points on the calibration screen 100, each at a different location and within the visual field of the user's left eye 111 and right eye 112. Preferably, the four display calibration points 100a-100d are distributed uniformly to provide a quadrilateral arrangement (e.g., rectangular arrangement) over the calibration screen 100 to achieve a more accurate calibration result. For instance, the four display calibration points 100a-100d are arranged at the four corners of the calibration screen 100. In certain embodiments, there are five, six, seven, eight, or more than eight calibration points on the calibration screen 100 for improving the calibration accuracy. In certain embodiments, the calibration points can be arranged at random positions on the calibration screen 100.

Figure 2:
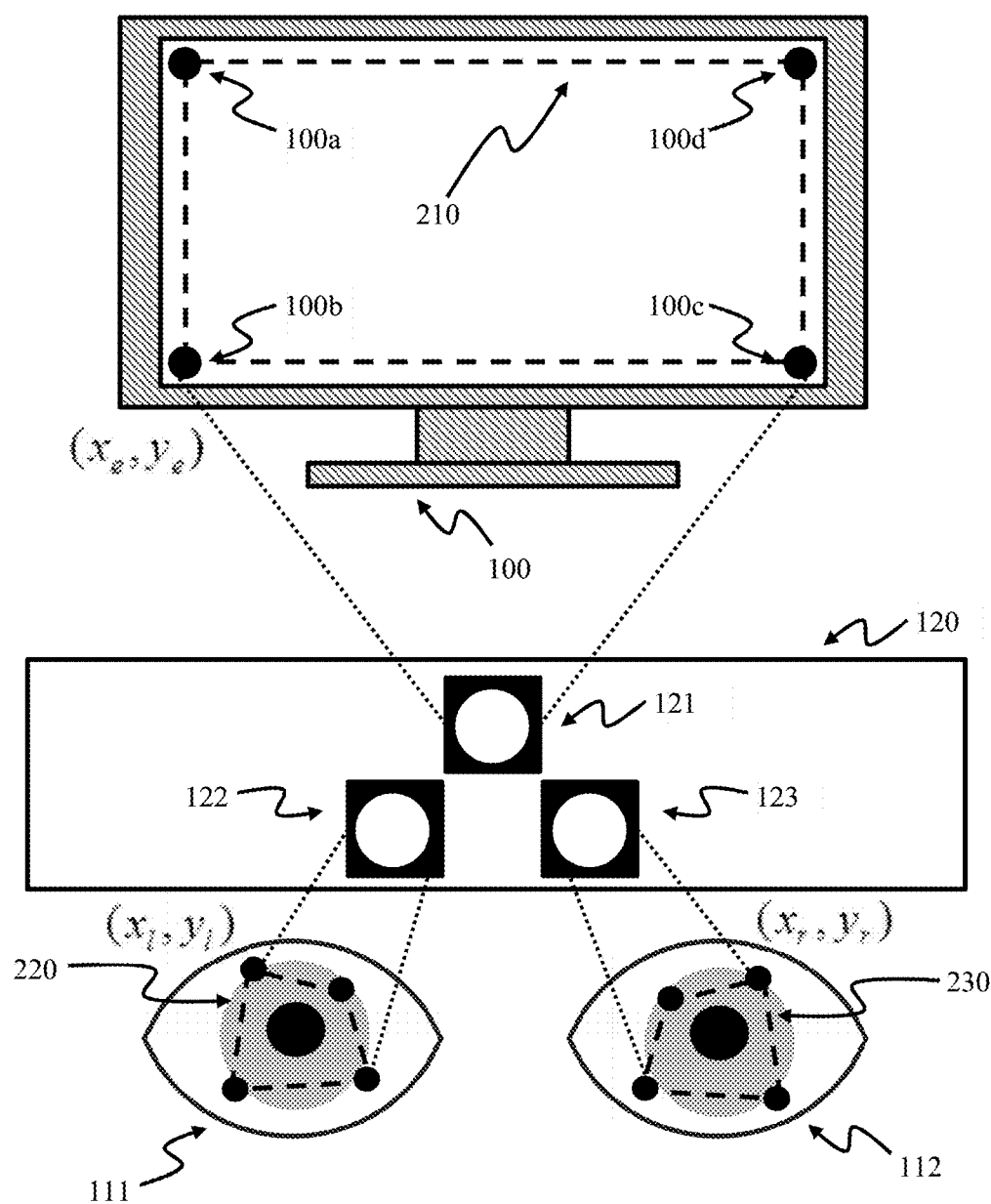
FIG. 2 is a diagram illustrating the method of capturing images of the calibration points by an external camera and capturing images of the user's pupil centers by two internal cameras during the calibration process in accordance with certain embodiments of the present disclosure.

A diagram, illustrating the setting for capturing images of the four display calibration points 100a-100d and the user's pupil centers 111a, 112a by a wearable device 120, is shown in FIG. 2, wherein the wearable device 120 comprises one external camera 121 and two internal cameras 122, 123. FIG. 11 is an exemplary wearable device in the form of a head frame comprising one external camera 121 and two internal cameras 122, 123 in accordance with certain embodiments of the present disclosure. The external camera 121 faces the calibration screen 100, the left internal camera 122 faces the left eye 111 and the right internal camera 123 faces the right eye 112. In certain embodiments, there are more than one external camera 121 and more than two internal cameras 122, 123. The processor is programmed to analyze the images obtained by the external camera 121 and the internal cameras 122, 123, to obtain the coordinates of the four display calibration points 100a-100d and the coordinates of the pupil centers 111a, 112a. In certain embodiments, the processor is programmed to, according to the images obtained by the two or more internal cameras 122, 123, identify sclera, iris and pupil, wherein the pupil area is much darker than the iris under IR illuminations. By comparing the gray value, the position of the pupil center can be identified for further determination of the gazing point.

An exemplary embodiment of the calibration process is as follow. First, the four display calibration points 100a-100d are displayed sequentially or randomly on the calibration screen 100, and each is displayed for a predetermined period of time for the user to gaze at before switching to another calibration point (S501). For instance, the calibration process can be controlled by the user or a suitable processor can be programmed such that each calibration point is displayed for not less than two seconds. In certain embodiments, the processor is programmed to display each calibration point for not more than ten seconds. In further embodiments, the processor is programmed to display each calibration point until the consecutive images of the pupil centers as acquired by the internal cameras 122, 123 are stable.

In an alternative exemplary embodiment of the calibration process, the four display calibration points 100a-100d are displayed simultaneously on the calibration screen 100, and the user is directed to gaze at each calibration point in a pre-determined order or as otherwise directed, e.g., by written instruction, audio cue, visual cue, etc.

For each of the four calibration points displayed as described above, the user is instructed to gaze at each calibration point, and the cameras 121-123 are programmed to capture one or more images of the calibration screen 100 and images of the user's left and right eyes 111, 112. The processor can obtain from the external camera 121 one or more images of the calibration screen 100 and can further determine four calibration points coordinates $(x_e, y_e, 1)$ 210a-210d for each display calibration point 100a-100d from the one or more images captured (S502). Similarly, the processor can also obtain from the two internal cameras 122, 123 binocular images of the left eye 111 and the right eye 112, and can further determine left pupil center calibration points coordinates $(x_l, y_l, 1)$ 220a-220d and right pupil center calibration points coordinates $(x_r, y_r, 1)$ 230a-230d, from the images when the user fixates on each of the four display calibration points 100a-100d (S503).

After all four display calibration points 100a-100d are displayed and images are captured accordingly, the processor is programmed to generate a screen calibration points sequence 210, a left pupil calibration point sequence 220 and a right pupil calibration point sequence 230 from the captured images for determining a mapping relationship. The mapping relationship can be determined in accordance with any mapping algorithm, including, but not limited to, polynomial relationships, homography matrices, or other approaches for obtaining a one to one mapping between two 2D coordinates. The screen calibration points sequence 210 is defined as the four consequentially connected calibration points coordinates 210a-210d. Similarly, the left pupil calibration point sequence 220 is defined as the four consequentially connecting left pupil center calibration points coordinates 220a-220d, and the right pupil calibration point sequence 230 is defined as the four consequentially connecting right pupil center calibration points coordinates 230a-230d. In order to obtain gazing point mapping relationship of the reference plane to the left eye 111, the processor performs homography mapping or other mapping approaches for each calibration point based on the screen calibration points sequence 210 and the corresponding left pupil calibration points sequence 220. Similarly, in order to obtain gazing point mapping relationship of the reference plane to the right eye 112, the processor performs homography mapping or other mapping approaches for each calibration point based on the screen calibration points sequence 210 and the corresponding right pupil calibration points sequence 230. It will be apparent to those skilled in the art that other 2D projective transformations other than the abovementioned homography transformation may be used without departing from the scope and spirit of the invention. In particular, polynomial interpolation may be applied instead to determine the transformation from the left pupil calibration points sequence 220 and the right pupil calibration points sequence 230 to the screen calibration points sequence 210.

Figure 3:
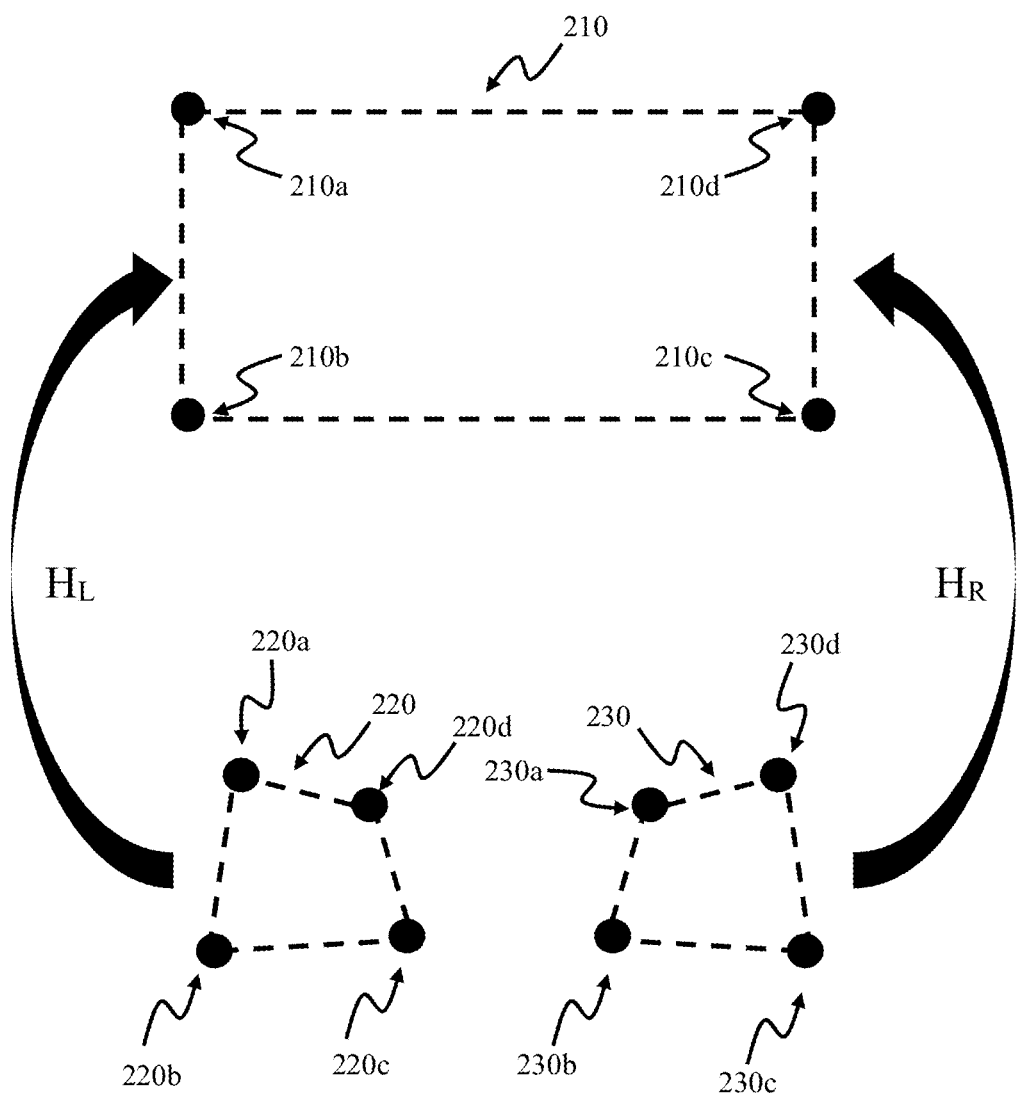
FIG. 3 is a diagram demonstrating the homography transformation for mapping the pupil centers from internal cameras to the calibration points from external camera in accordance with certain embodiments of the present disclosure.

FIG. 3 is a diagram demonstrating the homography transformation for mapping the left pupil calibration point sequence 220 to the screen calibration points sequence 210 for determining the left homography matrix $H_L$ (S504). The homography matrix $H_L$ is a 3×3 matrix such that we can map any left pupil center point $(x_l, y_l, 1)$ to the corresponding point with respect to the external camera image coordinate based on the following equation:

$$\begin{bmatrix} x_e \\ y_e \\ 1 \end{bmatrix} = H_L \begin{bmatrix} x_l \\ y_l \\ 1 \end{bmatrix} \qquad (1)$$

Similarly, the right pupil calibration point sequence 230 is mapped to the screen calibration points sequence 210 for determining the right homography matrix $H_R$ (S504). The homography matrix $H_R$ is a 3×3 matrix such that we can map any right pupil center point $(x_r, y_r, 1)$ to the corresponding point with respect to the external camera image coordinate based on the following equation:

$$\begin{bmatrix} x_e \\ y_e \\ 1 \end{bmatrix} = H_R \begin{bmatrix} x_r \\ y_r \\ 1 \end{bmatrix} \qquad (2)$$

After the calibration steps for identifying the mapping relationships have completed, advantageously there is a step of determining the pupillary distance $(D_{PP})$ 304 of the user based on images of the pupil in a relaxed state (S505). In certain embodiments of the present disclosure, the pupillary distance $(D_{PP})$ 304 can be determined by other methods, including direct measurement, monocular or binocular measurements, user input, or other possible measurement methods. This is the only eye parameter that is needed in the present disclosure for determining the gazing point. In contrast, the existing solutions may require complex computations using several eye parameters, such as the pupil center, the center of curvature of cornea and the radius of corneal.

Figure 4:
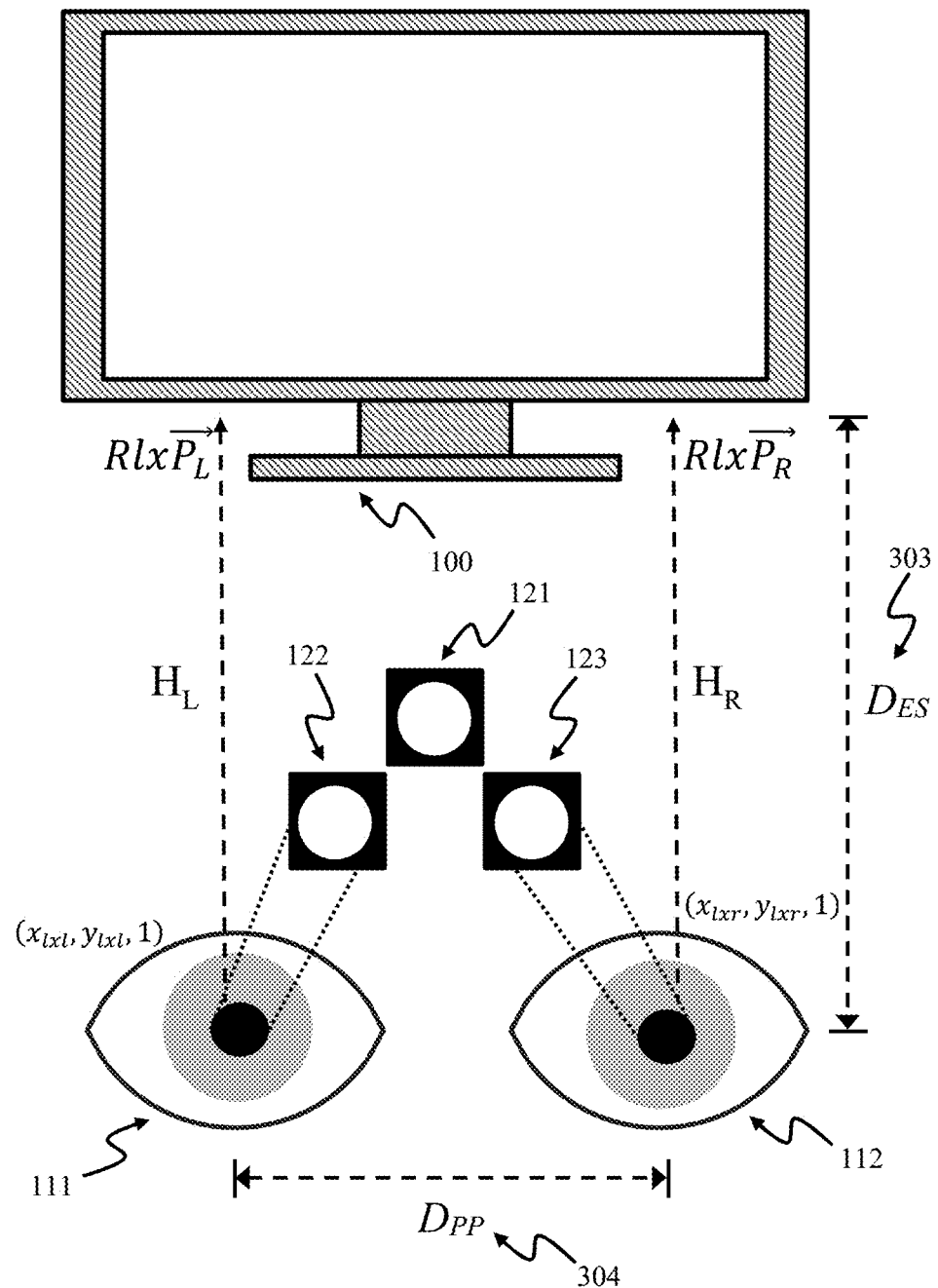
FIG. 4 is a representation of capturing the user's pupil centers with internal cameras at relaxed state during the calibration process in accordance with certain embodiments of the present disclosure.

When the user looks in the direction of the calibration screen 100 in a relaxed state, the user is not gazing at any specific point on the calibration screen 100. As shown in FIG. 4, when in a relaxed state, the visual axis of the left eye 111 and the visual axis of the right eye 112 are approximately parallel to each other directed towards the calibration screen. The left internal camera 122 and the right internal camera 123 can capture binocular images of the eyes for determining a left pupil relaxed coordinates $(x_{lxl}, y_{lxl}, 1)$ and a right pupil relaxed coordinates $(x_{lxr}, y_{lxr}, 1)$ of the user. The pupillary distance 304 can then be determined by performing homography transformation, by applying the left homography matrix $H_L$ and the right homography matrix $H_R$, according to:

$$\begin{bmatrix} x_{cel} \\ y_{cel} \\ 1 \end{bmatrix} = H_L * \begin{bmatrix} x_{lxl} \\ y_{lxl} \\ 1 \end{bmatrix} \qquad (3)$$

$$\begin{bmatrix} x_{cer} \\ y_{cer} \\ 1 \end{bmatrix} = H_R * \begin{bmatrix} x_{lxr} \\ y_{lxr} \\ 1 \end{bmatrix} \qquad (4)$$

With respect to the distance between the user and the calibration screen $(D_{ES})$ 303, various methods may be employed to determine the distance (S506). In one exemplary embodiment, the $D_{ES}$ 303 is estimated by a proximity sensor installed on the wearable device using RF signals or IR signals to measure the distance. Alternatively, the $D_{ES}$ 303 may be determined by user input or predetermined in accordance with a controlled laboratory environment. With the $D_{ES}$ 303, we can determine the pupillary distance $(D_{PP})$ based on equations (3) and (4):

$$RlxP_L^x = \frac{x_{cel}}{f_x} D_{ES} \qquad (5)$$

$$RlxP_R^x = \frac{x_{cer}}{f_x} D_{ES} \qquad (6)$$

$$D_{PP} = RlxP_R^x - RlxP_L^x = \left(\frac{x_{cer}}{fx} - \frac{x_{cel}}{fx}\right)D_{ES} \qquad (7)$$

With the foregoing calibration process, left homography matrix $H_L$ and right homography matrix $H_R$ are generated. The pupillary distance (DPP) 304 of the user can be determined. It should also be understood that the methods described herein are non-limiting with a vast number of variations exist. The algorithms and the like presented are only examples, in which the algorithms may be amended to adapt to particular situation or application.

Detection Process

The present disclosure further discloses a detection process for determining a position vector of a gazing point of the user with reference to a virtual screen 131, the virtual screen 131 being used as an intermediate screen for improving simplicity in detecting the gazing point.

The advantage of the present disclosure is to provide a method that can detect the position vector of the gazing point in a 3D space. There is no limitation on the position of the gazing point after calibration is completed. The calibration screen 100 is neither required nor referenced during the detection process.

In the method, when the user fixates on a gazing point, the external camera 121 captures one or more external camera images (S601). As the field of view of the external camera 121 can be close to or larger than the user's visual field, the external camera 121 is able to capture an image including the gazing point of the user. Nevertheless, the captured images are two dimensional images without depth perception or any data with respect to the distance of the gazing point away from the user. Similarly, the left internal cameras 122 capture images of the user's left eye 111 and the right internal cameras 123 capture images of the user's right eye 112 when the user is fixating on a gazing point (S601).

Based on the one or more gazing images captured by the two internal cameras 122, 123, the processor can further determine a left pupil gaze position vector $(x_{gzl}, y_{gzl}, 1)$ and a right pupil gaze position vector $(x_{gzr}, y_{gzr}, 1)$ using the image coordinates from the internal cameras 122, 123, when the user fixates on a gazing point (S602).

Figure 5:
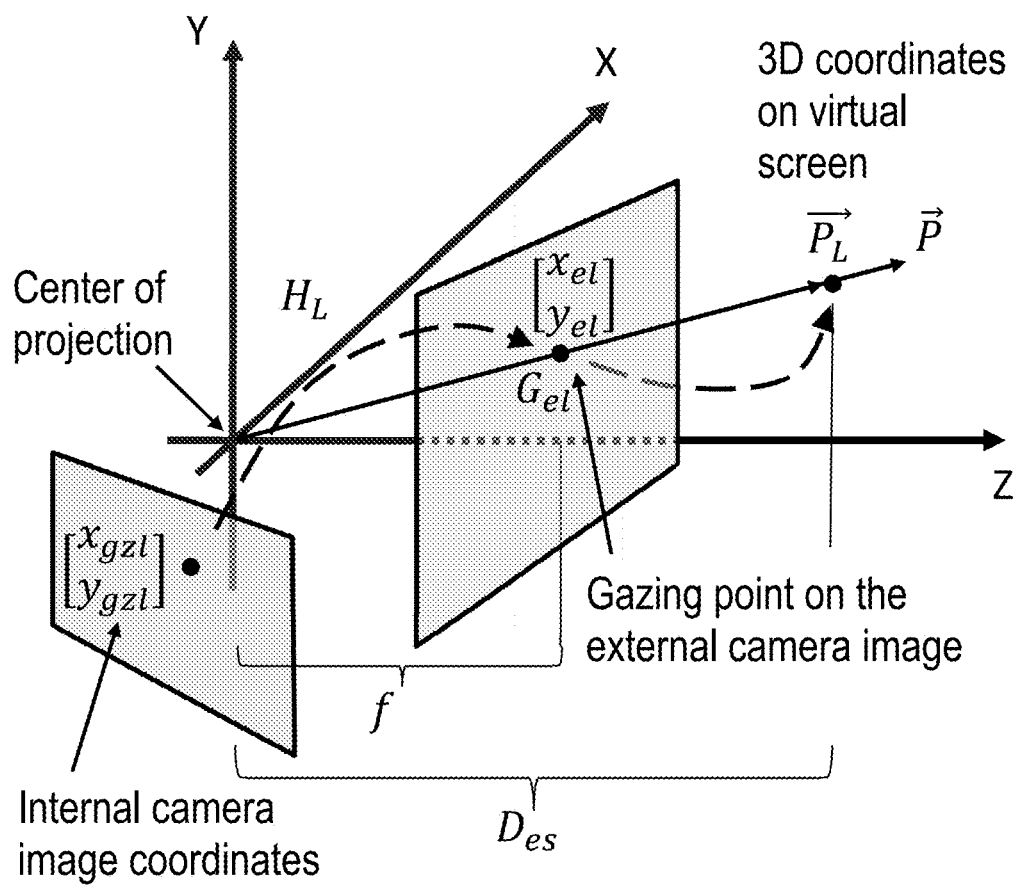
FIG. 5 is a diagram in 3D space illustrating how a gazing point is first mapped to an image obtained from the external camera by homography transformation, and further mapped to a virtual screen.

As illustrated in FIG. 5, the above position vectors of the gazing point are mapped to the image obtained from the external camera 121, which are further mapped to a virtual screen 131. The processor can first perform homography transformation, by applying the left homography matrix $H_L$ and the right homography matrix $H_R$, on the left pupil gaze position vector $(x_{gzl}, y_{gzl}, 1)$ and the right pupil center gaze position vector $(x_{gzr}, y_{gzr}, 1)$, to determine the left gazing point $(x_{el}, y_{el}, 1)$ and the right gazing point $(x_{er}, y_{er}, 1)$ on the external camera image (S603), based on the following equation:

$$\begin{bmatrix} x_{el} \\ y_{el} \\ 1 \end{bmatrix} = H_L \begin{bmatrix} x_{gzl} \\ y_{gzl} \\ 1 \end{bmatrix} \qquad (8)$$

$$\begin{bmatrix} x_{er} \\ y_{er} \\ 1 \end{bmatrix} = H_R \begin{bmatrix} x_{gzr} \\ y_{gzr} \\ 1 \end{bmatrix} \qquad (9)$$

The left gazing point and the right gazing point are both mapped to the same external camera image by homography transformation. The visual axes of the left eye and right eye can be estimated as the light paths passing through the external camera image at the left gazing point $(x_{el}, y_{el}, 1)$ and the right gazing point $(x_{er}, y_{er}, 1)$ respectively, wherein the external camera image is positioned at a focus plane of an external camera 121 with a predetermined focal length f.

Advantageously, the present disclosure provides a virtual screen 131, which is an imaginary screen positioned at a distance equivalent to the distance between the user and the calibration screen $(D_{ES})$ 303, as determined during the calibration process. The virtual screen 131 is an imaginary version to the calibration screen 100, which does not physically exist and is not visible in the real world and serves as an intermediate screen for detecting the gazing point and provides a reference plane for calculating the exact 3D position of the gazing point 401.

The gazing points on the external camera image can further be mapped to the virtual screen 131, as demonstrated in FIG. 5, by applying the pinhole camera triangle relationship (S604). The external camera image is located exactly at a distance f from the center of projection, and the axis directing towards the gazing point intersects the external camera image at a point $G_{el}$ with coordinates $(x_{el}, y_{el})$ for the left eye 111 and a point $G_{er}$ with coordinates $(x_{er}, y_{er})$ for the right eye 112. The focal length of the camera is further transferred to the pixel domain, denoted as a horizontal focal length $f_x$ and a vertical focal length $f_y$, with respect to the external camera image for calculating the gazing points coordinates. Therefore, the left gazing points on the virtual screen is $\vec{P}_L$ 402 with a position vector $(P_L^x, P_L^y, P_L^z)$, and the right gazing points on the virtual screen is $\vec{P}_R$ 403 with a position vector $(P_R^x, P_R^y, P_R^z)$, wherein the position vectors $\vec{P}_L$ and $\vec{P}_R$ are determined according to:

$$\vec{P}_L = \begin{bmatrix} P_L^x \\ P_L^y \\ P_L^z \end{bmatrix} = \begin{bmatrix} \frac{x_{el}}{f_x} D_{ES} \\ \frac{y_{el}}{f_y} D_{ES} \\ D_{ES} \end{bmatrix} \qquad (10)$$

$$\vec{P}_R = \begin{bmatrix} P_R^x \\ P_R^y \\ P_R^z \end{bmatrix} = \begin{bmatrix} \frac{x_{er}}{f_x} D_{ES} \\ \frac{y_{er}}{f_y} D_{ES} \\ D_{ES} \end{bmatrix} \qquad (11)$$

Figure 6:
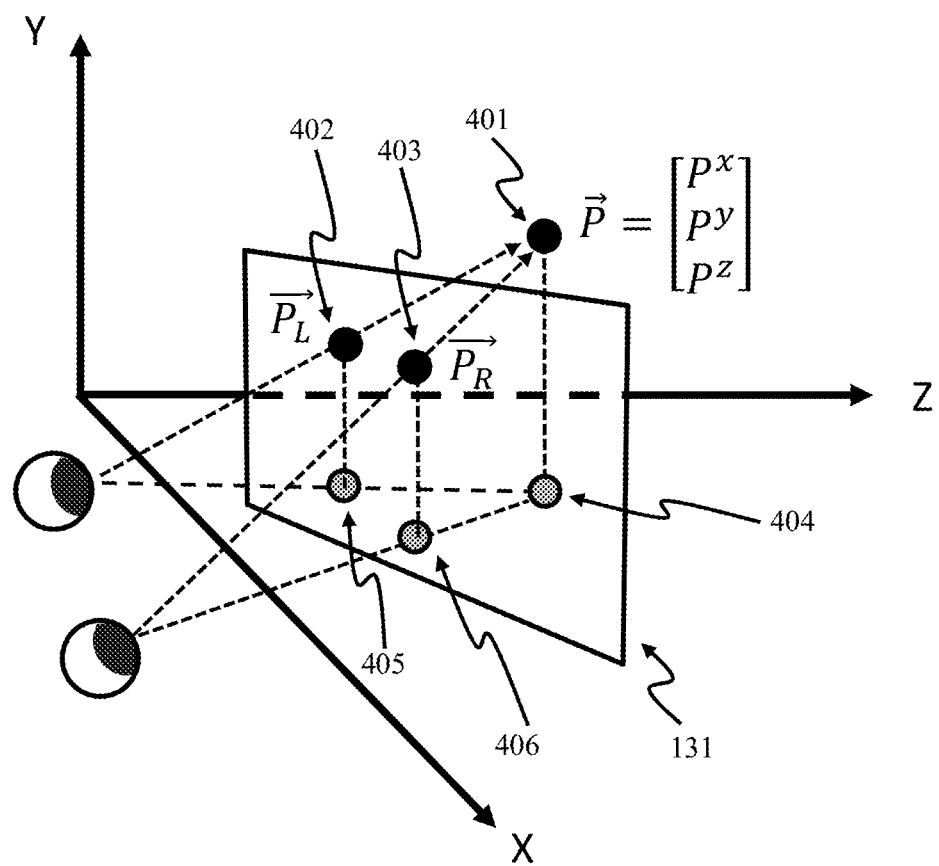
FIG. 6 is a diagram in 3D space illustrating how a gazing point is determined based on the coordinates on the virtual screen.
Figure 7:
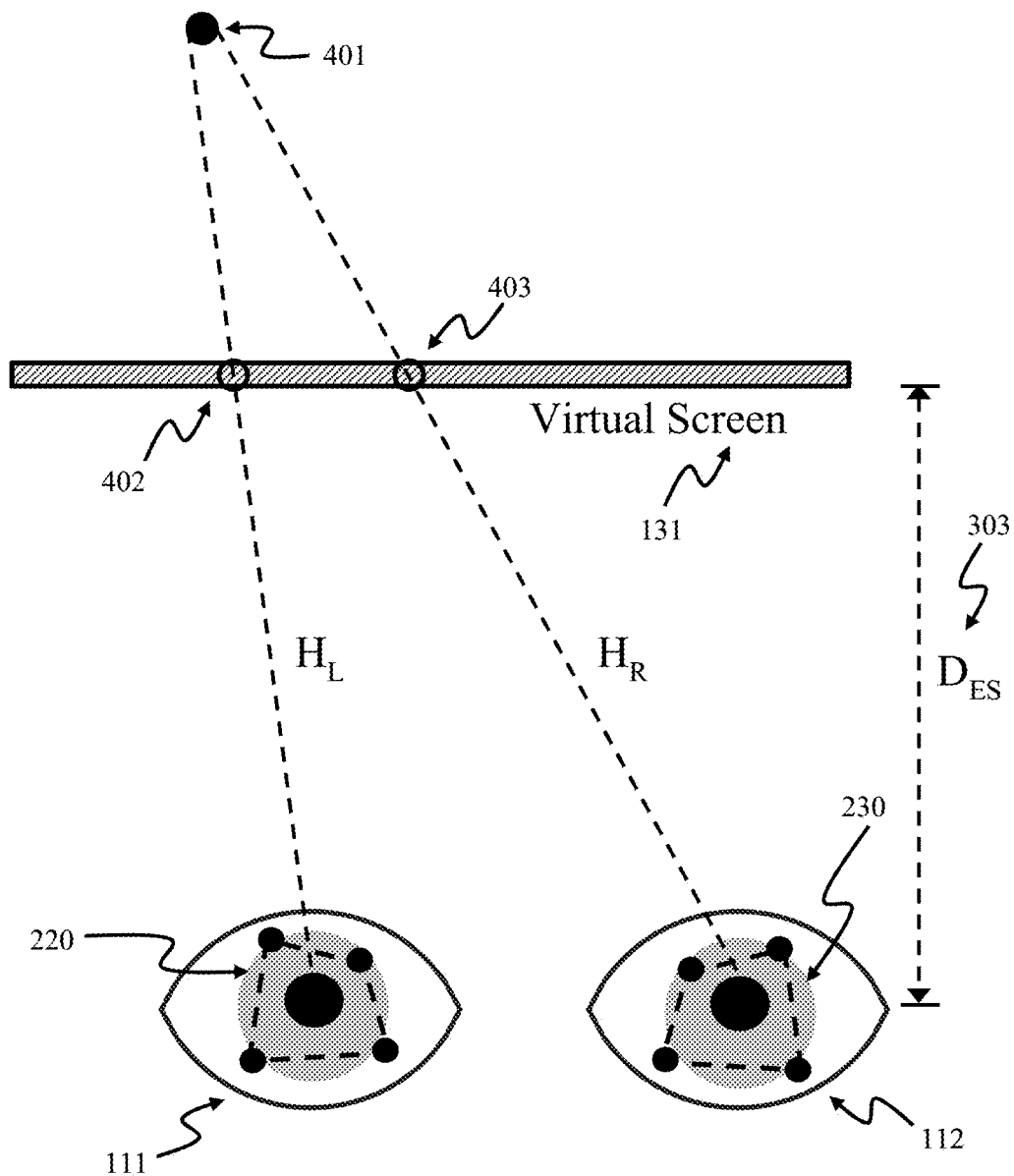
FIG. 7 is a diagram in 2D space illustrating the geometric relationship between the virtual screen and the gazing point according to FIG. 6.

The significance of the virtual screen 131 is evident from the illustration in FIGS. 6 and 7. As previously explained, the virtual screen 131 is an intermediate screen for detecting the gazing point, and it is a calibrated virtual plane with respect to the specific user of the wearable device 120. Therefore, the virtual screen 131 is applicable for obtaining the gazing point position vector in 3D space $\vec{P}$ 401 of the user with a position vector $(P^x, P^y, P^z)$. The gazing point 401, or the object that the user is looking at, is located at $\vec{P}$, while the visual axis of the left eye 111 passes through the virtual screen 131 at $\vec{P}_L$ 402. Similarly, the visual axis of the right eye 112 passes through the virtual screen 131 at $\vec{P}_R$ 403. By projecting the 3D positions to an X-Z plane, the gazing point 401 is projected to position 404, the $\vec{P}_L$ 402 is projected to position 405 and the $\vec{P}_R$ 403 is projected to position 406, which leads to the geometric relationship as described in FIG. 8 for determining the z position ($P^z$) of the gazing point 401.

Figure 8:
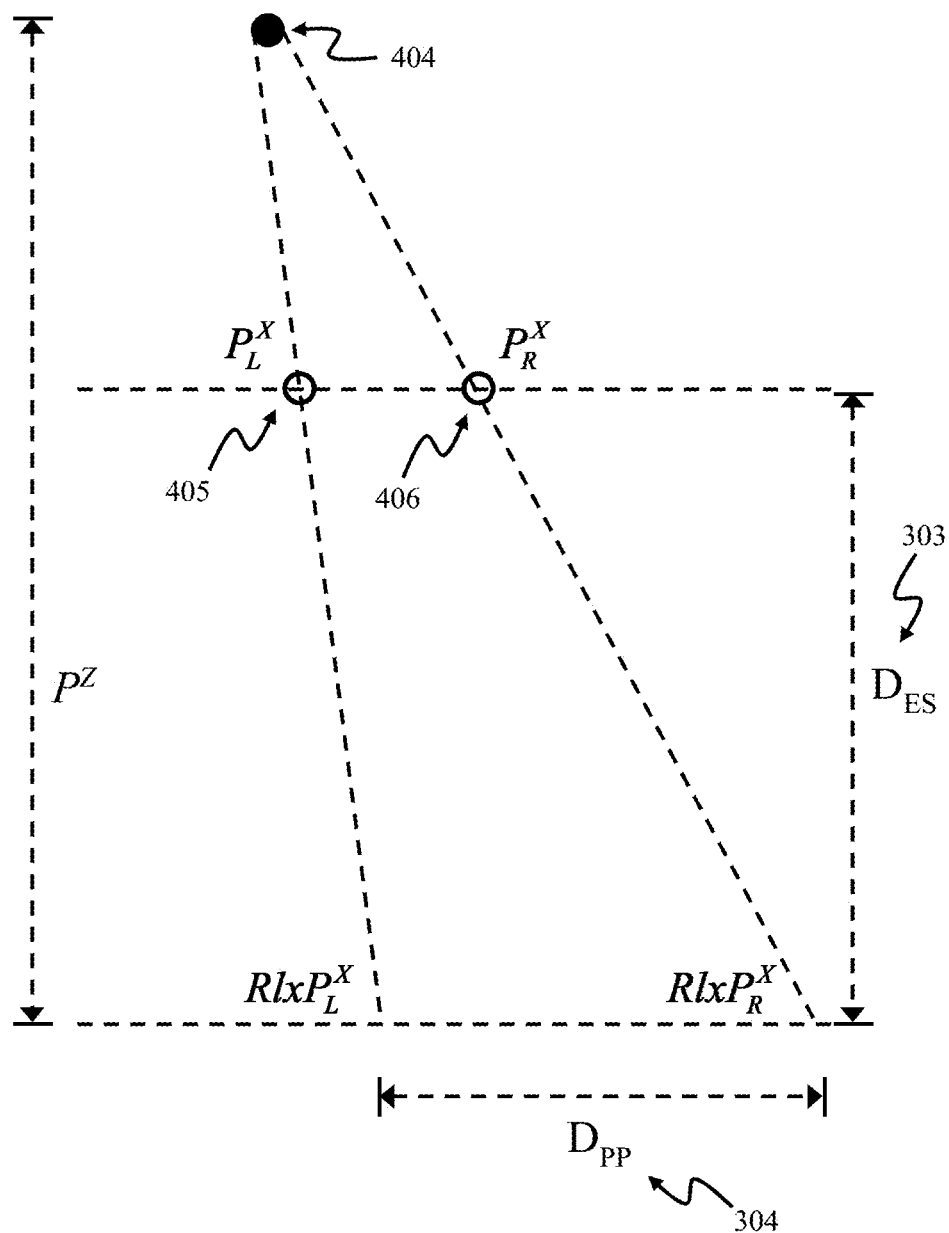
FIG. 8 is a diagram of an X-Z plane with the projected gazing point on virtual screen and real world according to FIG. 6.
Figure 9:
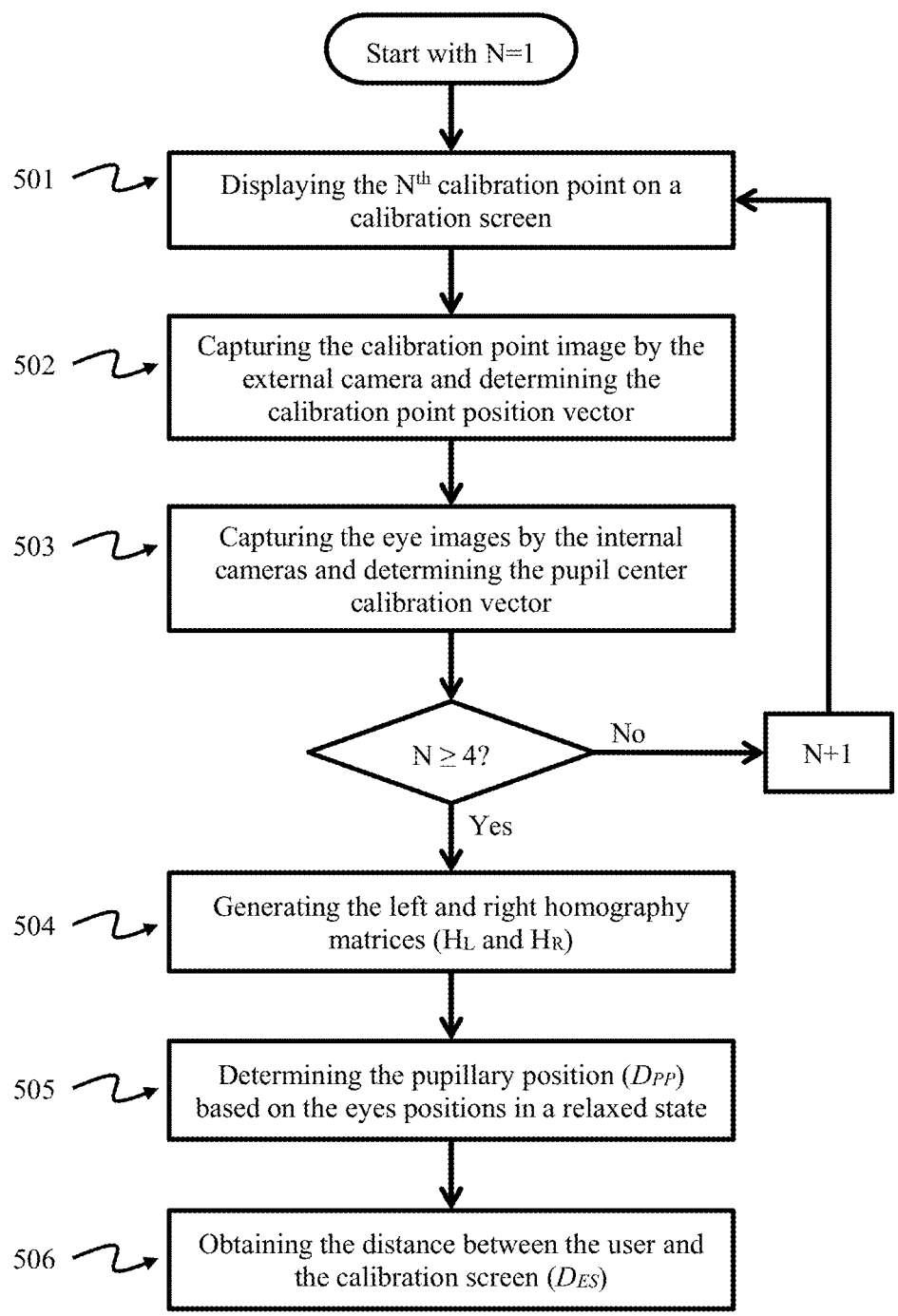
FIG. 9 is a flowchart illustrating the calibration process for calibrating a wearable device for determining the 3D position vector of the gazing point in accordance with certain embodiments of the present disclosure.
Figure 12:
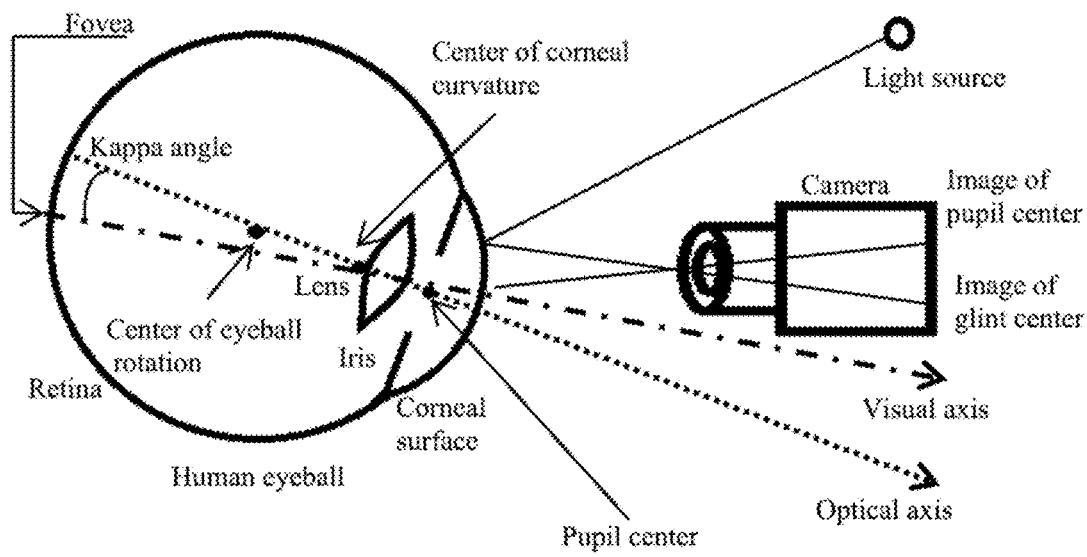
FIG. 12 is a model of a human eye ball, eye parameters and a conventional setup for detecting a gazing point.
Figure 13:
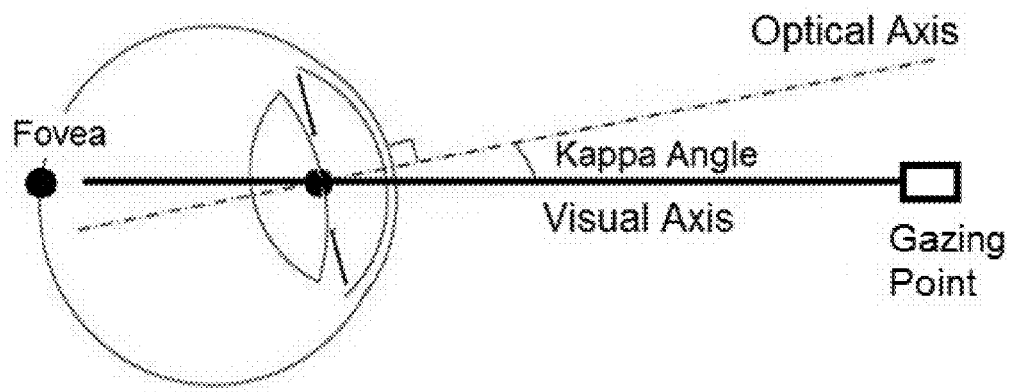
FIG. 13 is an eye ball model showing the kappa angle when fixating on a gazing point.

FIG. 8 is a diagram of an X-Z plane illustrating the visual axes after projection. Positions 404-406 are projected from the position vectors in the real world. In the X-Z plane, the virtual screen 131 is located at a distance of $D_{ES}$ 303 away from the user. The position 404, as projected from the gazing point 401, is located at a distance of $P^z$ away from the user. The position vector of ($P^x$, $P^y$, $P^z$) is not known, but the position vectors $P_L^x$ and $P_R^x$ on the virtual screen can be determined using equations (10) and (11), and the pupillary distance ($D_{PP}$) 304 can be determined during the calibration process using equations (5)-(7). The gazing point position vector in 3D space $\vec{P}$ 401 of the user can be calculated based on a simple ratio calculation (S605), as shown below:

$$\frac{P^x - P_R^x}{P^x - RlxP_R^x} = \frac{P^x - P_L^x}{P^x - RlxP_L^x} \quad (12)$$

$$\frac{P^y - P_R^y}{P^y - RlxP_R^y} = \frac{P_R^x - P_L^x}{D_{PP}} \quad (13)$$

$$\frac{P^z - D_{es}}{P^z} = \frac{P_R^x - P_L^x}{D_{PP}} \quad (14)$$

where $RLxP_R^y = y_{cer}/f_y D_{ES}$, as derived from equations (4) and (6).

Therefore, the gazing point position vector in 3D space $\vec{P}$ 401 can be calculated based on the left gazing point 402 and the right gazing point 403 on the virtual screen, the pupillary distance 304 of the user and the distance between the user and the calibration screen ($D_{ES}$) 303. A processor can be used to determine the position of the gazing point in a 3D space.

As illustrated from the above disclosure, the method using a virtual screen 131 as an intermediate screen for detecting the gazing point only involves simple computations. The pupillary distance 304 of the user is estimated by determining the pupil position in a relaxed state, and advantageously, this is the only biological parameter that is needed for estimating the gazing point. Other eye parameters and biological aspects of the user, such as eye radius, kappa angle and pupil size are not needed. Further, it is not necessary to provide one or more light sources directed towards the eyes for capturing images of the glints from corneal reflections.

With the present method, the wearable device can capture images for the processor to determine the position vector of the gazing point of the user in 3D space without any boundaries. The calibration screen 100 is only used during the calibration process and the gazing point is not limited by the dimension or relative position of the calibration screen 100. As the virtual screen 131 is positioned at a distance equivalent to the distance between the user and the calibration screen ($D_{ES}$) 303 as determined during the calibration process, it can be used as a proxy for the calibration screen. During the detection process, the present method can map the gazing points to the virtual screen 131, which is an imaginary version to the calibration screen 100, as a reference plane for calculating the exact 3D position of the gazing point 401. Further, it is not necessary for the system to obtain detailed eye parameters or other biological aspects of the user. In view of the simplicity of the computation by the processor when comparing with the conventional methods using corneal reflection, there is inherently a reduction in the hardware cost and processing time for performing the gazing point 401 detection. Unlike the conventional methods, the method and the system of the embodiments herein are highly customizable for each particular use and purpose. Therefore, it is possible to acquire an accurate detection of the gazing point in various environmental conditions.

Wearable Device

The present disclosure provides a system comprising one or more processor and a wearable device 120. The wearable device can further comprise one or more external cameras 121 and two or more internal cameras 122, 123. The processor may be implemented using general purpose or specialized computing devices, encompassed within a microcontroller (MCU), a custom integrated circuit, a digital signal processors (DSP), a field-programmable gate array (FPGA), an application specific integrated circuits (ASIC), a computer programmed to perform a method, a programmable I/O device, other semiconductor devices, or any suitable combination of the foregoing for executing a method for detecting a gazing point of a user in a 3D space in accordance with the methods described herein.

In certain embodiments of the present disclosure, the circuits in the system can be implemented at least partially by software programs, transistors, logic gates, analog circuit blocks, semiconductor devices, other electronic devices, or a combination of any aforesaid circuit structures. Because some of the circuits may be implemented as software, the actual connections and structures may differ depending on the manner in which the software is programmed.

In certain embodiments of the present disclosure, the processor may be programmed to control one or more computer systems, devices or apparatuses by using the visual field of a user as a user interface. In certain embodiments, a continuous detection of gazing point position vectors close to or around a position in 3D space may represent a confirmation with respect to the content pertaining to the position, e.g., a computer system may turn on the light of a room by detecting a continuous gazing by the user on a light switch. As the present disclosure provides a detection method in the 3D space which is not limited by the dimension or relative position of the calibration screen, the system can be applied to a wide variety of applications, such as controlling a mobile device, a smart home automation system, a vehicle, or acquiring information in relation to the objects within the user's visual field.

In certain embodiments of the present disclosure, the one or more external cameras 121 and the two or more internal cameras 122, 123 can be implemented as semiconductor charge-coupled devices (CCD); active pixel sensors (APS) in metal oxide semiconductor (CMOS) or N-type metal oxide semiconductor (NMOS); or a combination of any aforesaid devices. The purpose of the one or more external cameras 121 is to capture images with a field of view that includes the gazing point of the user. In certain embodiments, the external cameras 121 have a field of view close to or larger than the visual field of the user using the wearable device 120. In certain embodiments, the wearable device 120 comprises more than one external camera 121, such that the images from the plural external cameras can be merged to form a wider image for improving the field of view of the external cameras 121. In certain embodiments, the one or more external cameras 121 can be positioned at the middle of the wearable device 120 above the nose near the glabella of the user. On the other hand, the two or more internal cameras 122, 123 are configured to capture binocular images of the left and the right eyes 111, 112 of the user.

In certain embodiments, the internal cameras 122, 123 can be placed around the eyes. In certain embodiments, the wearable device 120 comprises more than one left internal camera 122 and more than one right internal camera 123, such that the images from the plural internal cameras can capture the pupil from different directions to ensure that the pupil center can be clearly captured.

In certain embodiments of the present disclosure, the wearable device 120 may be connected to a second device for processing the images. The wearable device 120 and the second device may be connected through any type of connection or network, including a local area network (LAN), a wide area network (WAN), or the connection through other devices, e.g., through the Internet using an Internet Service Provider (ISP), through other wireless connections, e.g., near-field communication, or through a hard wire connection, such as a USB connection. The wearable device 120 may send signals to the second device, wherein the second device comprises one or more processor for determining the gazing point. In certain alternative embodiments, the second device may act as a pass through device and may further send the data received from the wearable device 120 to a processor in other devices without processing the images of the wearable device 120. In certain alternative embodiments, the wearable device 120 further comprises the processor for determining the gazing point in accordance with the present disclosure.

It should be noted that the methods described herein may be implemented using instructions stored on a device readable storage medium such as a non-transitory storage device that are executed by a processor. The storage device may be, e.g., a digital memory, a magnetic storage medium, optical readable digital data storage medium, semiconductor device, or any suitable combination of the foregoing. More specific examples of the storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

The present disclosure may be embodied in other specific forms without departing from the spirit or essential characteristics thereof. The present embodiment is therefore to be considered in all respects as illustrative and not restrictive. The scope of the disclosure is indicated by the appended claims rather than by the foregoing description, and all changes that come within the meaning and range of equivalency of the claims are therefore intended to be embraced therein.

What is claimed is:

1. A method for detecting a gazing point of a user in a three dimensional (3D) space, the user wearing a wearable device comprising one or more external cameras and two or more internal cameras, the method comprising:
    a calibration process for determining a pupillary distance ($D_{PP}$) of the user when the user views a calibration screen, a distance between the user and the calibration screen being denoted as $D_{ES}$; and
    a detection process for determining a gazing point position of the user with reference to a virtual screen, the virtual screen being positioned from the user by $D_{ES}$ and being used as an intermediate screen enabling a detection of the gazing point in the 3D space;

wherein:
    the calibration process comprises the steps of:
        generating a left homography matrix ($H_L$) and a right homography matrix ($H_R$), wherein the step of generating the left homography matrix and the right homography matrix comprises the step of calibrating the one or more external cameras and the two or more internal cameras using a plurality of calibration points on the calibration screen;
        determining, according to one or more images captured by the two or more internal cameras, a left pupil relaxed coordinate ($X_{lxl}$, $Y_{lxl}$, 1) and a right pupil relaxed coordinate ($x_{lxr}$, $Y_{lxr}$, 1) of the user's left and right eyes when the user fixates on the calibration screen in a relaxed state; and
        determining the pupillary distance of the user by performing homography transformation using the left and the right homography matrices, according to:
        where:

$$\begin{bmatrix} x_{cel} \\ y_{cel} \\ 1 \end{bmatrix} = H_L * \begin{bmatrix} x_{lxl} \\ y_{lxl} \\ 1 \end{bmatrix}$$

$$\begin{bmatrix} x_{cer} \\ y_{cer} \\ 1 \end{bmatrix} = H_R * \begin{bmatrix} x_{lxr} \\ y_{lxr} \\ 1 \end{bmatrix}$$

$$D_{PP} = \left(\frac{x_{cer}}{f_x} - \frac{x_{cel}}{f_x}\right) D_{ES}$$

$f_x$ is a horizontal focal length of the one or more external cameras;
    ($x_{cel}$, $Y_{cel}$, 1) is a first external camera image coordinate mapped from the left pupil relaxed coordinate; and
    ($x_{cer}$, $Y_{cer}$, 1) is a second external camera image coordinate mapped from the right pupil relaxed coordinate;
    and
    the detection process comprises the steps of:
        capturing, by the one or more external cameras, an external camera image;
        determining, according to one or more gazing images captured by the two or more internal cameras, a left and a right pupil gaze positions when the user fixates on the gazing point; and
        determining a left and a right gazing points on the virtual screen for calculating the gazing point position.

2. The method of claim 1, wherein the step of determining the left and the right gazing points on the virtual screen comprises applying the left homography matrix and the right homography matrix on the left and the right pupil gaze positions, respecitvely, on the one or more gazing images captured by the two or more internal cameras; and mapping the left and the right pupil gaze positions to image coordinates on the external camera image, whereby the gazing point position in the 3D space is calculated based on the left and the right gazing points on the virtual screen, the pupillary distance ($D_{PP}$) of the user and the distance between the user and the calibration screen ($D_{ES}$).

3. A system comprising one or more processors and a wearable device, the wearable device comprising one or more external cameras and two or more internal cameras, wherein the internal cameras are configured to capture the left and the right eyes of the user, the external cameras are configured to capture an external camera image, and the one or more processors are configured to execute a method for detecting a gazing point of a user in a 3D space according to the method of claim 2.

4. The method of claim 1, wherein the step of calibrating the one or more external cameras and the two or more internal cameras using the plurality of calibration points on the calibration screen comprises:

displaying the plurality of calibration points on the calibration screen sequentially, wherein each calibration point is positioned at one of corners of the calibration screen;

determining, according to one or more images captured by the one or more external cameras, a plurality of calibration points coordinates for each of the plurality of calibration points;

determining, according to one or more images captured by the two or more internal cameras, a plurality of pupil center calibration points coordinates of the user's left and right eyes when the user fixates on each of the plurality of calibration points; and mapping the plurality of calibration points coordinates with the plurality of pupil center calibration points coordinates of the user's left and right eyes for each of the plurality of calibration points.

5. A system comprising one or more processors and a wearable device, the wearable device comprising one or more external cameras and two or more internal cameras, wherein the internal cameras are configured to capture the left and the right eyes of the user, the external cameras are configured to capture an external camera image, and the one or more processors are configured to execute a method for detecting a gazing point of a user in a 3D space according to the method of claim 4.

6. The method of claim 1, wherein the left homography matrix $H_L$ and the right homography matrix $H_R$ are determined according to $$\begin{bmatrix} x_e \\ y_e \\ 1 \end{bmatrix} = H_L \begin{bmatrix} x_l \\ y_l \\ 1 \end{bmatrix}$$

$$\begin{bmatrix} x_e \\ y_e \\ 1 \end{bmatrix} = H_R \begin{bmatrix} x_r \\ y_r \\ 1 \end{bmatrix}$$

where:

($x_e$, $y_e$, 1) is the calibration points coordinates as determined according to one or more images captured by the one or more external cameras; and ($x_l$, $y_l$, 1) and ($x_r$, $y_r$, 1) are the pupil center calibration points coordinates of the user's left and right eyes as determined according to one or more images captured by the two or more internal cameras.

7. The method of claim 1, wherein the image coordinates on the external camera image are determined according to $$\begin{bmatrix} x_{el} \\ y_{el} \\ 1 \end{bmatrix} = H_L \begin{bmatrix} x_{gzl} \\ y_{gzl} \\ 1 \end{bmatrix}$$

$$\begin{bmatrix} x_{er} \\ y_{er} \\ 1 \end{bmatrix} = H_R \begin{bmatrix} x_{gzr} \\ y_{gzrr} \\ 1 \end{bmatrix}$$

where:

($x_{el}$, $y_{el}$, 1) is the left gazing point on the external camera image;

($x_{er}$, $y_{er}$, 1) is the right gazing point on the external camera image; and ($X_{gzl}$, $Y_{gzl}$, 1) is the left pupil gaze position and ($x_{gzr}$, $y_{gzr}$, 1) is the right pupil gaze position as determined according to one or more gazing images captured by the two or more internal cameras.

8. A system comprising one or more processors and a wearable device, the wearable device comprising one or more external cameras and two or more internal cameras, wherein the internal cameras are configured to capture the left and the right eyes of the user, the external cameras are configured to capture an external camera image, and the one or more processors are configured to execute a method for detecting a gazing point of a user in a 3D space according to the method of claim 7.

9. The method of claim 1, wherein the virtual screen is an imaginary screen positioned at a distance equivalent to the predetermined distance between the user and the calibration screen.

10. The method of claim 1, wherein the step of determining the left and the right gazing points on the virtual screen further comprises applying pinhole camera triangle relationship on the image coordinates on the external camera image to determine the left and the right gazing points on the virtual screen.

11. The method of claim 10, wherein the left and the right gazing points on the virtual screen are determined according to $$\vec{P}_L = \begin{bmatrix} P_L^x \\ P_L^y \\ P_L^z \end{bmatrix} = \begin{bmatrix} \frac{x_{el}}{f_x} D_{ES} \\ \frac{y_{el}}{f_y} D_{ES} \\ D_{ES} \end{bmatrix}$$

$$\vec{P}_R = \begin{bmatrix} P_R^x \\ P_R^y \\ P_R^z \end{bmatrix} = \begin{bmatrix} \frac{x_{er}}{f_x} D_{ES} \\ \frac{y_{er}}{f_y} D_{ES} \\ D_{ES} \end{bmatrix}$$

where:

($X_{el}$, $Y_{el}$, 1) is the left gazing point coordinate on the external camera image;

($X_{er}$, $Y_{er}$, 1) is the right gazing point coordinate on the external camera image;

$\vec{P}_L$ is the left gazing point on the virtual screen;

$\vec{P}_R$ is the right gazing point on the virtual screen;

$f_x$ is a horizontal focal length in a pixel domain of the external camera; and $f_y$ is a vertical focal length in a pixel domain of the external camera.

12. A system comprising one or more processors and a wearable device, the wearable device comprising one or more external cameras and two or more internal cameras, wherein the internal cameras are configured to capture the left and the right eyes of the user, the external cameras are configured to capture an external camera image, and the one or more processors are configured to execute a method for detecting a gazing point of a user in a 3D space according to the method of claim 1.

13. A method for detecting a gazing point of a user in a three dimensional (3D) space, the user wearing a wearable device comprising one or more external cameras and two or more internal cameras, the method comprising:
a calibration process for determining a left and a right pupil relaxed coordinates on the one or more images captured by the two or more internal cameras, and a pupillary distance ($D_{PP}$) of the user when the user views a calibration screen, a distance between the user and the calibration screen being denoted as $D_{ES}$; and
a detection process for determining a gazing point position of the user in the 3D space with reference to a virtual screen, the virtual screen being positioned from the user by $D_{ES}$ and being used as an intermediate screen enabling a detection of the gazing point in the 3D space;
wherein:
the calibration process comprises the step of:
generating a left and a right mapping relationships, wherein
the step of generating the left and the right mapping relationships comprises the step of calibrating the one or more external cameras and the two or more internal cameras using a plurality of calibration points on the calibration screen;
the detection process comprises the steps of:
capturing, by the one or more external cameras, an external camera image;
determining, according to one or more gazing images captured by the two or more internal cameras, a left and a right pupil gaze positions when the user fixates on the gazing point; and
determining a left and a right gazing points on the virtual screen for calculating the gazing point position in the 3D space;
the gazing point position is calculated according to:

$$\frac{P^x - P_R^x}{P^x - RlxP_R^x} = \frac{P^x - P_L^x}{P^x - RlxP_L^x}$$

$$\frac{P^y - P_R^y}{P^y - RlxP_R^y} = \frac{P_R^x - P_L^x}{D_{PP}}$$

$$\frac{P^x - D_{es}}{P^z} = \frac{P_R^x - P_L^x}{D_{PP}}$$

where:
$f_x$ is a horizontal focal length of the one or more external cameras;
$f_y$ is a vertical focal length of the one or more external cameras;

$$\vec{P} = \begin{bmatrix} P^x \\ P^y \\ P^z \end{bmatrix}$$

is the gazing point position in the 3D space;
($P_L^x$, $P_L^Y$, $P_L^Z$) is a position vector of the left gazing point on the virtual screen; and ($P_R^x$, $P_R^Y$, $P_R^Z$) is a position vector of the right gazing point on the virtual screen;

$$RlxP_L^x = \frac{x_{cel}}{f_x} D_{ES};$$

$$RlxP_R^x = \frac{x_{cer}}{f_x} D_{ES};$$

$$RlxP_R^y = \frac{y_{cer}}{f_y} D_{ES};$$

($X_{cel}$, $Y_{cel}$, 1) is a first external camera image coordinate mapped from the left pupil relaxed coordinate; and
($X_{cer}$, $Y_{cer}$, 1) is a second external camera image coordinate mapped from the right pupil relaxed coordinate;
the left mapping relationship is used for mapping the left pupil gaze position on the one or more gazing images captured by the two or more internal cameras to a first image coordinate of the left pupil gaze position on the external camera image; and
the right mapping relationship is used for mapping the right pupil gaze position on the one or more gazing images captured by the two or more internal cameras to a second image coordinate of the right pupil gaze position on the external camera image.

14. A system comprising one or more processors and a wearable device, the wearable device comprising one or more external cameras and two or more internal cameras, wherein the internal cameras are configured to capture the left and the right eyes of the user, the external cameras are configured to capture an external camera image, and the one or more processors are configured to execute a method for detecting a gazing point of a user in a 3D space according to the method of claim 13.

15. A method for detecting a gazing point of a user in a three dimensional (3D) space, the user wearing a wearable device comprising one or more external cameras and two or more internal cameras, the method comprising:
a calibration process for determining a pupillary distance ($D_{PP}$) of the user when the user views a calibration screen, a distance between the user and the calibration screen being denoted as $D_{ES}$; and
a detection process for determining a gazing point position of the user in the 3D space with reference to a virtual screen, the virtual screen being positioned from the user by $D_{ES}$ and being used as an intermediate screen enabling a detection of the gazing point in the 3D space;
wherein:
the calibration process comprises the steps of:
generating a left homography matrix ($H_L$) and a right homography matrix ($H_R$), wherein the step of generating the left homography matrix and the right homography matrix comprises the step of calibrating the one or more external cameras and the two or more internal cameras using a plurality of calibration points on the calibration screen; and
determining, according to one or more images captured by the two or more internal cameras, a left pupil relaxed coordinate ($X_{lxl}$, $Y_{lxl}$, 1) and a right pupil relaxed coordinate ($x_{lxr}$, $Y_{lxr}$, 1) of the user's left and right eyes when the user fixates on the calibration screen in a relaxed state;

the detection process comprises the steps of:
- capturing, by the one or more external cameras, an external camera image;
- determining, according to one or more gazing images captured by the two or more internal cameras, a left and a right pupil gaze positions when the user fixates on the gazing point; and
- determining a left and a right gazing points on the virtual screen, wherein the step of determining the left and the right gazing points on the virtual screen comprises applying the left and the right homography matrices on the left and the right pupil gaze positions and mapping the left and the right pupil gaze positions to image coordinates on the external camera image, whereby the gazing point position in the 3D space is calculated according to:

$$\frac{P^x - P_R^x}{P^x - RlxP_R^x} = \frac{P^x - P_L^x}{P^x - RlxP_L^x}$$

$$\frac{P^y - P_R^y}{P^y - RlxP_R^y} = \frac{P_R^x - P_L^x}{D_{PP}}$$

$$\frac{P^z - D_{es}}{P^z} = \frac{P_R^x - P_L^x}{D_{PP}}$$

where:

$f_x$ is a horizontal focal length of the one or more external cameras;

$f_y$ is a vertical focal length of the one or more external cameras;

$$\vec{P} = \begin{bmatrix} P^x \\ P^y \\ P^z \end{bmatrix}$$

is the gazing point position in the 3D space;

$(P_L^x, P_L^Y, P_L^Z)$ is a position vector of the left gazing point on the virtual screen; and $(P_R^x, P_R^Y, P_R^Z)$ is a position vector of the right gazing point on the virtual screen;

$$\begin{bmatrix} x_{cel} \\ y_{cel} \\ 1 \end{bmatrix} = H_L * \begin{bmatrix} x_{lxl} \\ y_{lxl} \\ 1 \end{bmatrix};$$

$$\begin{bmatrix} x_{cer} \\ y_{cer} \\ 1 \end{bmatrix} = H_R * \begin{bmatrix} x_{lxr} \\ y_{lxr} \\ 1 \end{bmatrix};$$

$$RlxP_L^x = \frac{x_{cel}}{f_x} D_{ES};$$

$$RlxP_R^x = \frac{x_{cer}}{f_x} D_{ES};$$

$$RlxP_R^y = \frac{y_{cer}}{f_y} D_{ES};$$

$(X_{cel}, Y_{cel}, 1)$ is a first external camera image coordinate mapped from the left pupil relaxed coordinate; and $(X_{cer}, Y_{cer}, 1)$ is a second external camera image coordinate mapped from the right pupil relaxed coordinate;

the left homography matrix is used for mapping the left pupil gaze position on the one or more gazing images captured by the two or more internal cameras to a first image coordinate of the left pupil gaze position on the external camera image; and the right homography matrix is used for mapping the right pupil gaze position on the one or more gazing images captured by the two or more internal cameras to a second image coordinate of the right pupil gaze position on the external camera image.

16. A system comprising one or more processors and a wearable device, the wearable device comprising one or more external cameras and two or more internal cameras, wherein the internal cameras are configured to capture the left and the right eyes of the user, the external cameras are configured to capture an external camera image, and the one or more processors are configured to execute a method for detecting a gazing point of a user in a 3D space according to the method of claim 15.

* * * * *